United States Patent [19]
Cooley et al.
[11] 3,957,676
[45] May 18, 1976

[54] CHEMICAL DIGESTION OF LOW LEVEL NUCLEAR SOLID WASTE MATERIAL

[75] Inventors: Carl R. Cooley; Ronald E. Lerch, both of Richland, Wash.
[73] Assignee: The United States of America as represented by the United States Energy Research and Development Administration, Washington, D.C.

[22] Filed: Sept. 22, 1972
[21] Appl. No.: 291,476

[52] U.S. Cl. ........................... 252/301.1 W; 423/20
[51] Int. Cl.[2] ........................................ C09K 3/00
[58] Field of Search ................ 252/301.1 W; 423/20

[56] References Cited

UNITED STATES PATENTS

| | | | |
|---|---|---|---|
| 2,733,126 | 1/1956 | Spiegler | 423/20 |
| 2,741,541 | 4/1956 | Smith | 423/20 |
| 2,849,278 | 8/1958 | Feldt | 423/20 X |
| 2,955,019 | 10/1960 | Dickert et al. | 423/20 X |
| 3,557,013 | 1/1971 | Detilleux et al | 252/301.1 W |

*Primary Examiner*—Stephen J. Lechert, Jr.
*Attorney, Agent, or Firm*—John A. Horan; Richard E. Constant; Robert M. Poteat

[57] ABSTRACT

A chemical digestion for treatment of low level combustible nuclear solid waste material is provided and comprises reacting the solid waste material with concentrated sulfuric acid at a temperature within the range of 230°–300°C and simultaneously and/or thereafter contacting the reacting mixture with concentrated nitric acid or nitrogen dioxide. In a special embodiment spent ion exchange resins are converted by this chemical digestion to noncombustible gases and a low volume noncombustible residue.

6 Claims, No Drawings

CHEMICAL DIGESTION OF LOW LEVEL NUCLEAR SOLID WASTE MATERIAL

The invention described herein was made in the course of, or under, a contract with the United States Atomic Energy Commission. It relates general to acid digestion processes and more particularly to a chemical digestion of low level combustible nuclear solid waste material.

BACKGROUND OF THE INVENTION:

Disposal of nuclear wastes is an important problem in the nuclear energy field today since many radioactive wastes must be stored for very long time periods to assure that no health hazard will be incurred. Low level nuclear combustible solid waste materials are a particular problem because of the relatively large bulk of materials associated with small amounts of contamination. Typical combustible solid waste materials of concern are those resulting from fuel fabrication operations, such as used rubber gloves, paper, rags, metals, glassware, brushes and various plastics. Of particular concern as well is the disposal of spent ion exchange resins from reactors, fuel fabrication plants and reprocessing plants (e.g. estimated to comprise from 500 to 800 cubic feet of material per year per nuclear reactor).

Present practice consists of packaging these solid waste materials in containers ranging from cardboard boxes lined with plastic bags to steel drums, then burying the packages in pits or trenches. This technique involves difficult and expensive handling of the scrap materials, transporting the packaged materials over roadways and finally storing the materials in monitored repositories or burial grounds. Potential release of contamination to the environment is possible as a result of rapid decay of the containers, or inadvertent combustion, etc. Moreover, in fuel reprocessing plants and fuel preparation plants, spent ion exchange resins contain significant amounts of plutonium as well as other fission products which may preclude direct burial of these resins.

Inasmuch as a large percentage of the contaminated solid waste material is simply light-weight, bulky combustible material, incineration of nuclear solid waste materials has been studied extensively, but it is subject to poor control of combustion, with attendant off-gas system difficulties and severe corrosion problems, coupled with rather expensive maintenance problems. Mechanical compaction of the solid waste material has also been studied extensively with volume reductions of two to ten-fold being achieved. In general, however, compaction and sorting of nuclear solid waste materials are moderately expensive in that special personnel protection devices are needed over and above normal protective equipment costs.

In another approach a process based on the use of sulfuric acid with a selenium catalyst has been used to reduce the volume of combustible low level radioactive waste. This process is described in "Treatment of Combustible, Solid, Low-Level Radioactive Waste at RISQ, the Danish Atomic Energy Commission Research Establishment," Proceedings of a Symposium on Practices in the Treatment of Low and intermediate Level Radioactive Waste, IAEA and ENEA, Vienna, December 1965. While this process affords volume reductions approaching 60, the process requires the use of a very toxic catalyst and apparently has poor control of the reaction rate.

It is therefore highly desirable, and a primary object of this invention, to have a controlled, safe, less expensive and more readily manageable form of treatment of low level nuclear combustible scrap material with suitable volume reductions.

SUMMARY OF THE INVENTION

In accordance with this invention combustible solid waste material containing low level solid nuclear wastes are chemically digested by reacting the combustible solid waste material with concentrated sulfuric acid at a temperature within the range of 230°– 300°C and simultaneously and/or thereafter contacting the reacted mixture with concentrated nitric acid or nitrogen dioxide whereby the carbonaceous material is oxidized to gaseous byproducts and a low volume residue. The process may be conducted batchwise or by inremental additions of solid waste material and nitric acid or nitrogen dioxide The low volume residue may be further processed by separating the noncombustible solids from the resulting aqueous solution, neutralizing and drying the residue. Apparent volume reductions on laboratory scale runs of up to 160 have been achieved, but depend on the amount of inorganic chemicals in the material being digested. Advantageously, very little acid is consumed since it can be recycled or recovered and reused indefinitely, it being used only as a chemical combustion media to release combustion products at a controlled rate and at a low temperature. The final residue or "ash" is inactive and suitable as a noncombustible material for shipping and storage.

DESCRIPTION OF THE PREFERRED EMBODIMENT

The present invention is broadly applicable to chemically digesting any low level combustible nuclear solid waste material. This includes both uranium - and plutonium - bearing solid waste which is generated as a normal byproduct during fabrication and reprocessing of these nuclear fuels.

The solid waste material which is normally a heterogeneous mixture of paper, plastics, rubber, polyethylene, metal, glassware, brushes, etc., is reacted at an elevated temperature with concentrated sulfuric acid containing up to five volume percent concentrated nitric acid. The reaction may be carried out in conventional equipment, such as Pyrex, a borosilicate glass. It is preferred that this step be carried out at or near the reflux temperature of the sulfuric acid and should be within the range of 230°C to 300°C. For lower temperatures the reaction rate is slower and, although this offers a means of control, generally higher temperatures of about 270°C are preferable for complete reaction. Temperatures above boiling are not necessary. The process can be operated at or slightly below atmospheric pressure, a distinct advantage for containment of contamination.

The digestion time will, of course, vary for the type of solid waste material but one hour is generally adequate.

Although the reactions are more complex and nonstoichiometric, the general reactions involve both (1) and (2).

$$C_mH_n + n/2\ H_2SO_4 \rightarrow nH_2O + n/2\ SO_2 + mC \quad (1)$$

$$C + 2\ H_2SO_4 \rightarrow 2\ H_2O + 2\ SO_2 + CO_2 \quad (2)$$

However, the addition of nitric acid suppresses reaction (2) in favor of (3).

$$3C + 4\ HNO_3 \rightarrow 4\ NO + 2\ H_2O + 3\ CO_2 \quad (3)$$

where the nitric acid (or nitrogen dioxide) serves to oxidize the carbonaceous material and is itself reduced, principally to NO.

Simultaneously and/or after the initial reaction with the sulfuric acid has subsided, concentrated nitric acid (e.g. 70 percent $HNO_3$0 or nitrogen dioxide is slowly added to the boiling mixture. For batchwise operation the process may be terminated when the accumulation of residue in the sulfuric acid becomes excessive and is not removed by the continued addition of nitric acid. Again the reaction time will vary depending upon the amount of carbonaceous material present. In general, nitric acid addition may be continued until the sulfuric acid changes from black to transparent which indicates completion of the oxidation. As noted hereinbefore the oxidation of the carbonaceous material from the sulfuric acid step can be carried out with either nitric acid or nitrogen dioxide with the former being preferred. Nitrogen dioxide, however, may be used simply to sparge the hot sulfuric acid.

The speed of digestion can be controlled by the temperature and by the rate of addition of nitric acid and solid waste material. Reaction rates increase at the higher temperatures and with more rapid addition of nitric acid.

Although combinations of nitric acid, sulfuric acid, and water are commonly used in organic nitration reactions, the reactions are conducted at much lower temperatures and with more dilute acids. Nitration reactions are not experienced with the common solid waste materials as long as the temperature is kept above 200°C and, preferably, near 270°C where the normal vapor pressure of the system keeps the sulfuric acid concentration sufficiently high to avoid nitration reactions.

As a special embodiment of this invention spent ion exchange resins may be converted to noncombustible gases and low volume residue by chemical digestion with sulfuric acid - nitric acid as hereinbefore described for low level solid waste material. The process is equally applicable to processing spent anion or cation exchange resins and the carbonized resin is oxidized by the nitric acid (or nitrogen dioxide) to carbon dioxide with the nitric acid being reduced to $NO_x$.

Advantageously, the process reagents may be recycled and reused to provide an economical chemical digestion process. The $NO_x$ from the nitric acid step may be readily collected by conventional off-gas absorption and oxidized with air or oxygen back to nitric acid for reuse. The same adsorption-oxidation operation recycles traces of $H_2SO_4$ discharged as $SO_2$. The sulfuric acid solution, after filtering out the solid residue, is ready for reuse. Hence, the expense for chemical reagents is minimal, the acids being only used as chemical combustion media to release combustion products. It should be emphasized that the present chemical digestion process readily digests most plastics without the use of catalysts or chemicals other than nitric acid, sulfuric acid and air or oxygen. The residue or "ash" may be neutralized with a base and dried by evaporation to a final inactive ash. The final product is noncombustible, composed generally of inorganic matter and is easily handled for onsite plant storage or timely shipments to selected waste repositories.

Recoverable values, such as plutoinum, remain in a non-refractory form and are readily leached from the residue by conventional techniques.

Having described the invention in a general fashion the following examples are given by way of illustration to further describe in greater detail the present chemical digestion process.

EXAMPLE I

Ten (10) grams of tygon tubing (~32 ml volume) were added to 75 ml of concentrated sulfuric acid (95 percent) at ~270°C. After reacting for one hour, concentrated nitric acid was added to the hot solution at the rate of about one ml every 6 minutes. After 24 ml of nitric acid were added the solution changed from black to a clear orange-yellow.

The solution was cooled to room temperature and a yellow precipitate formed. The precipitate was filtered from the solution and weighed. It weighed 0.9*g* and was less than ½ ml in volume, giving an apparent volume reduction of >64 for the process.

The precipitate was soluble in water, acetone, dilute sodium hydroxide, nitric acid, and ethyl alcohol. It was insoluble in carbon tetrachloride.

EXAMPLE II

One hundred (100) grams (~320 ml) of mixed waste material (i.e., 15*g* tygon tubing, 15*g* neoprene rubber, 15*g* polyethylene, 15*g* latex tubing, 15*g* latex rubber gloves, 15*g* plastic vial and 10*g* plastic tape) were added to one liter of concentrated sulfuric acid at ~270°C. The mixture was allowed to digest for 1 hour, then concentrated nitric acid was added to the mixed solution at the rate of 25 ml every 30 minutes. A volume of 380 ml of concentrated nitric acid was necessary to change the solution from opaque black to a clear yellow. A fine grey residue remained undissolved.

The solution was cooled to room temperature and filtered. The separated residue weighed 3.7 grams and occupied about 2 ml, giving an apparent volume reduction of 160.

The residue was insoluble in water, acetone, dilute sodium hydroxide, nitric acid, ethyl alcohol, and carbon tetrachloride. It was not combustible and converted to a fine white ash when heated to 1200°C (indicating the presence of inorganic matter rather than organic).

EXAMPLE III

Exactly 250 milliliters of concentrated sulfuric acid containing five volume percent concentrated nitric acid were heated to 270°C in a closed flask connected to a condenser. Polyvinyl chloride (PVC) and concentrated nitric acid were simultaneously added to the hot acid, polyvinyl at a rate of 16 grams per hour and nitric acid at a rate of 30 ml per hour. Nitric acid addition was continued for 15 minutes after each 16 gram batch of PVC was added in order to complete the oxidation. The experiment was stopped after nine 16-gram batches of polyvinyl chloride had been added. Final conditions were as follows: 144 grams of polyvinyl chloride digested, 320 ml of nitric acid added, 185 ml additional sulfuric acid added to maintain the starting volume of 250 ml, 490 ml of condensate collected. The sulfuric acid was cooled to room temperature and filtered. Approximately 4.3 grams (~5 ml in volume) of residue were filtered from the solution representing a weight reduction of a 39 and a volume reduction of 33. The final residue was insoluble in water, acetone, nitric acid and sodium hydroxide.

Off gases from the process include: CO, $CO_2$, $CL_2$, HCL, $NO_x$, etc. Sulfur dioxide ($SO_2$) evolution is greatly suppressed by maintaining a nitric acid-rich system.

EXAMPLE IV

Individual three (3) gram portions of ion exchange resin of varying types were added to 150 ml of hot (270°C) concentrated sulfuric acid. After 15 minutes reaction, concentrated nitric acid was slowly added to the mixture. Approximately 10 ml of nitric acid were required to completely oxidize the 3*g* of resin leaving a clear solution of sulfuric acid. The resins were chosen to represent different types of matrices (e.g., polystyrene, epoxy polyamines, phenolic) with different functional groups (e.g. tertiary amine, secondary amine, sulfonic acid, etc.).

After 45 grams of resin (~72 ml in volume) had been completely oxidized, the sulfuric acid solution was cooled to room temperature and filtered. Approximately 14 milligrams (~0.1 ml in volume) of insoluble residue were filtered from the solution representing a weight reduction of 3,000 and a volume reduction of 700.

The sulfuric acid was evaporated to dryness and about 2 grams (~2.7 ml in volume) of salt were collected giving overall weight and volume reductions of 22 and 27, respectively.

What is claimed is:

1. A method for processing low level light weight, bulky combustible nuclear solid waste material comprising the steps of reacting said solid waste material with concentrated sulfuric acid at a temperature within the range of 230° – 300°C and simultaneously and/or thereafter contacting said reacted waste with concentrated nitric acid or nitrogen oxides whereby carbonaceous material is oxidized to gaseous byproducts and a low volume residue.

2. The method of claim 1 wherein said solid waste material comprises a heterogeneous mixture of organic and inorganic materials.

3. The method of claim 1 wherein said solid waste material comprises spent ion exchange resins.

4. The method of claim 1 wherein said reaction step is conducted by incremental additions of solid waste material and said contacting step is conducted by incremental additions of nitric acid or nitrogen oxides to said solid waste material.

5. The method of claim 1 including the additional steps of separating said low volume residue from the resulting aqueous solution, neutralizing said residue and drying the residue.

6. The method of claim 1 wherein said low level solid waste material includes uranium - and plutonium - bearing material.

* * * * *